May 18, 1937.  C. W. GINTER ET AL  2,080,566
OIL DISPENSING SYSTEM
Filed Feb. 19, 1934  4 Sheets-Sheet 1
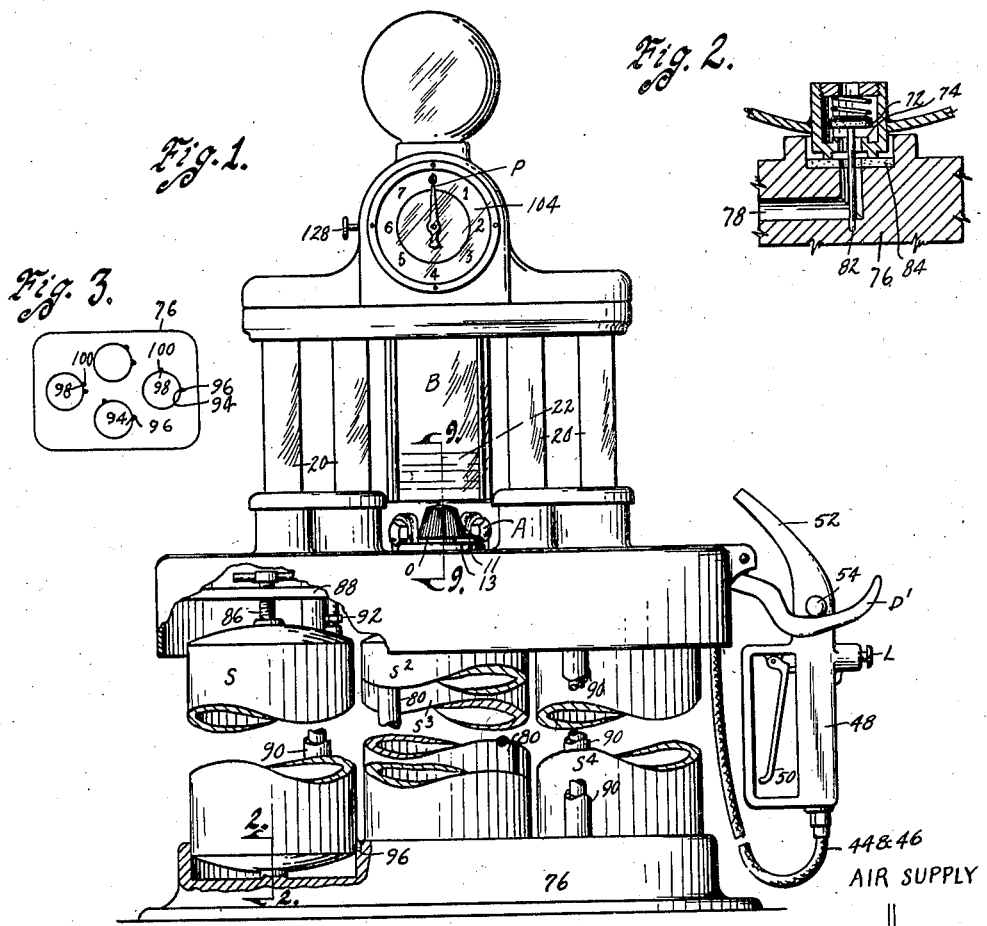
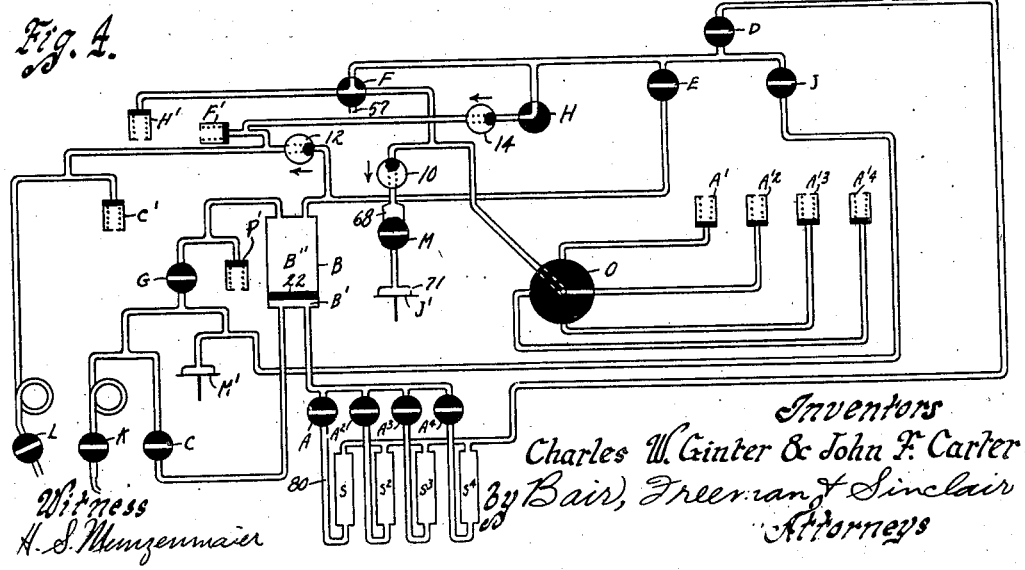
Inventors
Charles W. Ginter & John F. Carter
By Bair, Freeman & Sinclair
Attorneys
Witness
H. S. Menzenmaier

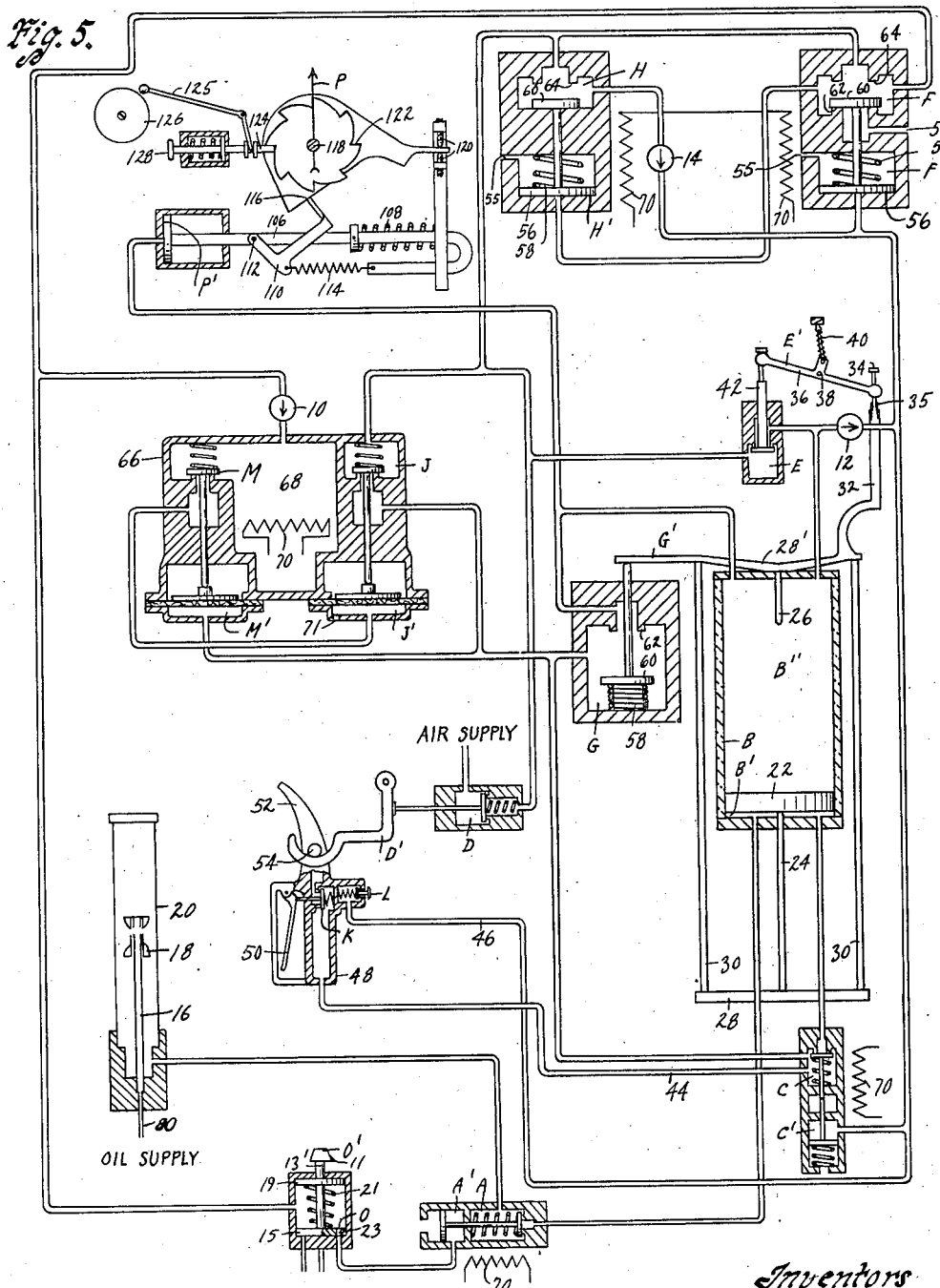

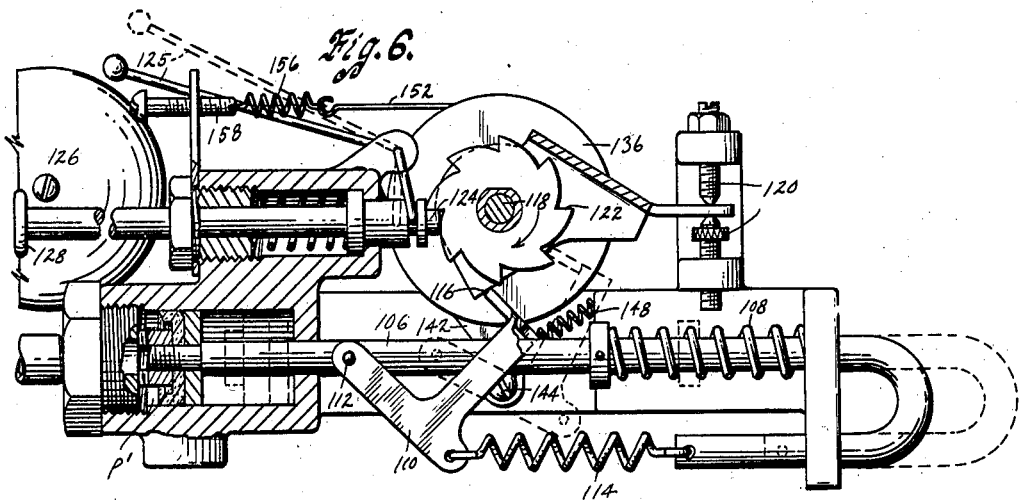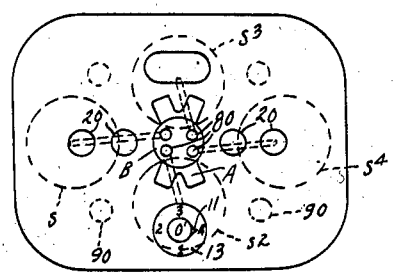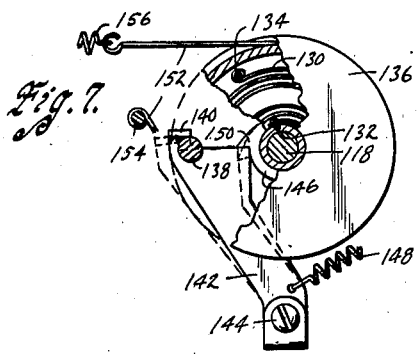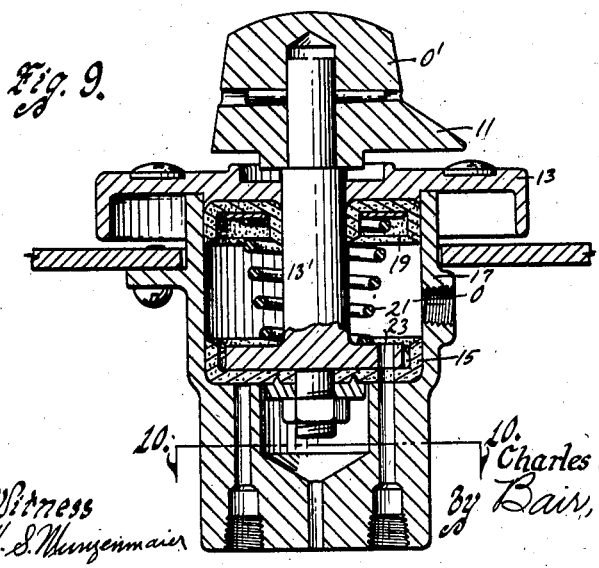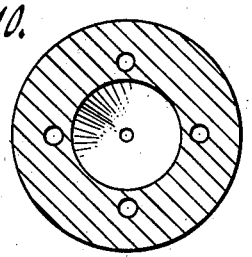

May 18, 1937.   C. W. GINTER ET AL   2,080,566
OIL DISPENSING SYSTEM
Filed Feb. 19, 1934   4 Sheets-Sheet 4
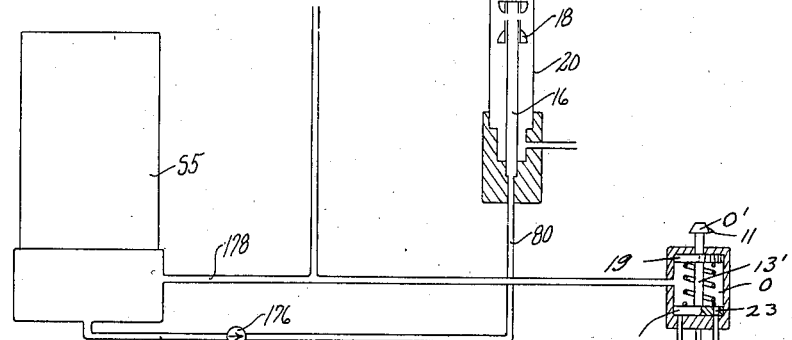
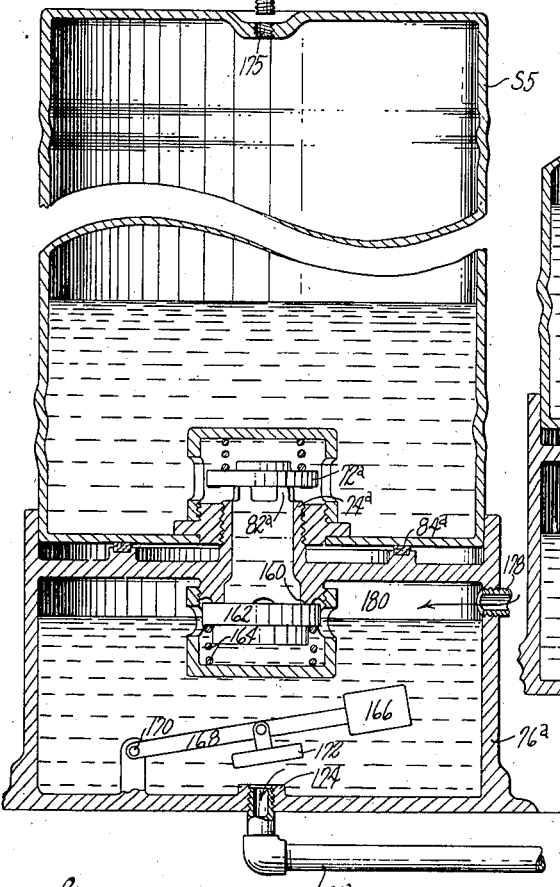
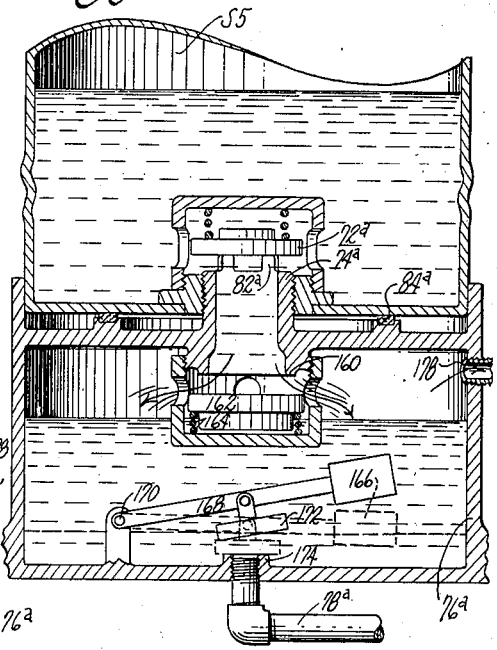

Patented May 18, 1937

2,080,566

UNITED STATES PATENT OFFICE 2,080,566

OIL DISPENSING SYSTEM

Charles W. Ginter and John F. Carter, Bryan, Ohio, assignors to The Aro Equipment Corporation, Bryan, Ohio, a corporation of Ohio Application February 19, 1934, Serial No. 711,952

55 Claims. (Cl. 221—95)

An object of our invention is to provide an oil dispensing system of simple, durable and comparatively inexpensive construction.

A further object is to provide a system including an apparatus for dispensing liquids in general, and oils in particular, the apparatus being arranged so that through a single measuring mechanism and a single dispensing hose a selected one of a variety of cylinder oils or the like may be dispensed and the apparatus being arranged so that any number of predetermined quantities of the liquid desired may be so dispensed.

A further object is to provide an automatically operable apparatus in which a supporting hook for a dispensing nozzle is arranged to commence the dispensing operation for a given quantity of liquid, the completion of the operation being effected by opening a discharge valve on the dispensing nozzle.

Still a further object is to arrange the apparatus so that the cycle of operations can be repeated without returning the nozzle to its supporting hook, this being accomplished by a control operable at the nozzle when desired.

Another object is to provide a pneumatically operated mechanism for measuring and dispensing quantities of liquids, such as cylinder oil, from any one of a number of storage tanks, each having a lubricant of different grade or the like, so that the apparatus can be utilized in a service station as a means for dispensing different types or grades of cylinder oil, the apparatus being compact so as to take up but little room.

Another object is to provide dispensing mechanism in which after the oil dispensing operation, air is blown through the piping, the dispensing hose and the nozzle to clean out the remaining film of the oil that was previously dispensed so that another oil can then be dispensed without getting a substantial amount of the first oil, which might have been of a different grade, mixed with the second oil.

Still another object is to provide novel mechanism for indicating that a predetermined quantity of oil or the like has been dispensed, this mechanism being operable only after the dispensing and cleaning out operations are completed.

Still a further object is to provide a novel arrangement of storage containers so associated with a dispenser stand or the like that they may be easily disconnected therefrom when empty and replaced with full containers, the containers and the stand having cooperating parts whereby the contents of the container are retained therein by a valve which is opened by insertion of the container into position.

A further object is to provide a novel type of storage tank base construction having an intermediate pressure chamber into which oil can flow from a storage tank and into which air can be periodically introduced for forcing the oil to a higher level without the necessity of having to fill the entire storage tank itself with compressed air to expel its contents.

With these and other objects in view our invention consists in the construction, arrangement and combination of the various parts of our device, whereby the objects contemplated are attained, as hereinafter more fully set forth, pointed out in our claims, and illustrated in the accompanying drawings, in which:

Figure 1 is a front elevation of the apparatus of our oil dispensing system, parts thereof being broken away to conserve space on the drawings.

Figure 2 is an enlarged sectional view on the line 2—2 of Figure 1, showing the connection of one of the oil containers with the base of the apparatus.

Figure 3 is a diagrammatic plan view showing further details of this connection.

Figure 4 is a diagrammatic view of the various valves, actuators, etc. of the system.

Figure 5 is a diagrammatic view more in detail showing how the valves operate and how their actuators are associated with them, as well as the various air and oil connections.

Figure 6 is a front enlarged elevation of a counter mechanism within the head of the apparatus shown in Figure 1.

Figure 7 is a broken away view of a part of Figure 6 showing details of construction.

Figure 8 is a diagrammatic plan view of the apparatus showing the relative locations of various parts thereof.

Figure 9 is an enlarged sectional view on the line 9—9 of Figure 1 showing an oil selector valve.

Figure 10 is a sectional view on the line 10—10 of Figure 9 showing details thereof.

Figure 11 is a diagrammatic view of a modified form of oil storage tank.

Figure 12 is an enlarged vertical sectional view of the same showing the parts in one position; and Figure 13 is a similar view showing the parts in another position.

On the accompanying drawings, we have used the reference character A to indicate an oil supply valve. As shown in Figure 5, it is normally seated by a spring, but can be unseated by a piston within a cylinder when air is admitted thereto from a selector valve O.

The selector valve O has an actuator O' which is merely a manual control knob having a pointer 11 adapted to cooperate with a numbered dial 13 to indicate the oil selected from various storage tanks S, S², S³ and S⁴ (see Figure 4). The control knob O' is secured to a shaft 13' having secured to it in turn a cup leather 15 located within a cylinder 17. A cup leather 19 serves as a seal against leakage between the head of the cylinder, the shaft 13' and the dial 13. A spring 21 is interposed between the cup leathers to retain them expanded and, in addition, the presence of compressed air within the cylinder 17 keeps them expanded.

In the operation of the selector valve, it may be rotated while there is no air in the cylinder 17 so that a port 23 therein may register with any one of four ports leading to actuators A', A'², A'³ and A'⁴ as shown in Figure 4. The particular actuator subsequently charged with compressed air admitted to the cylinder 17 then opens the proper valve A corresponding to the storage tank from which the selection of oil has been made.

While the compressed air is present in the cylinder 17, it creates enough friction between the cup leathers 15 and 19 and their confining parts of the cylinder 17 and dial 13 as to make it very difficult, if not impossible, to rotate the knob O' by hand, thus insuring that the selector valve will not be erroneously changed during a dispensing operation and mix the different oils capable of dispensation.

We have shown the selector valve arranged for four storage tanks, but it is obvious that any number can be provided, there being one oil valve A for each tank of the system.

For each oil valve A, there is provided a stand pipe 16 provided with perforations and having a cap 18 provided with vanes and perforations, these parts being located within a transparent cylinder 20 and the parts 16, 18 and 20 being interposed between the oil supply from the storage tank and the valve A. Thus when the valve A opens to permit oil to flow from the oil supply to an oil compartment B' of a measuring and dispensing cylinder B, the oil flows through the perforations of the stand pipe 16 and the cap 18 and across the vanes of the cap, causing the cap to rotate and thus visually indicating which of the oils in the tubes 20 is being dispensed during that particular cycle of operation.

The cylinder B has a piston 22 therein above which is an air compartment B''. The piston 22 is adapted to reciprocate in the cylinder B and when it reaches its lower limit, it engages a rod 24, while at its upper limit it engages a rod 26. The rods 24 and 26 are carried by cross arms 28 and 28' which are connected together by rods 30. The assembly of the elements 24 to 30 inclusive reciprocates a boss 32 in which is adjustably mounted a stop rod 34.

A stop sleeve 35 is also adjustably mounted in the boss. The stop rod and the stop sleeve 35 are adjustable so as to co-relate the action of a master valve E and a blow out and exhaust valve G, as well as accurately predetermine the quantity of oil dispensed by the mechanism.

Receiving oil from the chamber B' of the cylinder B is a normally closed outlet valve C having an actuating mechanism C'. A normally closed cut-off valve D is interposed between the supply of compressed air and the master valve E as well as all other parts of the dispensing apparatus. The actuating mechanism for the cut-off valve D comprises a supporting arm D' which is normally lowered by the weight of a dispensing valve 48 thereon for closing the cut-off valve D.

The master valve E is associated with the cut-off valve D for controlling air therefrom to the dispensing cylinder B as well as to other parts of the apparatus. The actuating mechanism E' for the valve E consists of a toggle lever 36 pivoted at 38 and actuated by the head of the stop rod 34 and the upper end of the stop sleeve 35. The toggle action is produced by an overcenter spring 40. The toggle lever 36 engages a valve plunger 42 of the master valve E to move it to its closed or open positions in accordance with the movement of the boss 32 produced by the reciprocating piston 22 in the cylinder B.

A selector and charging control valve F of four way type is provided for controlling the actuating mechanism A' through the selector valve O and for controlling an actuator H'. The valve F has an actuator F', while the actuator H' has a charging valve H associated therewith.

The actuators F' and H' comprise pistons 56 within cylinders to which compressed air can be admitted for moving the pistons against the action of springs 58. This, in the case of the valve F, unseats a valve plug 60 from a normally closed seat 62 and seats it against a normally open seat 64, while in the case of the charging valve H, it merely seats the valve plug against a normally open seat 64. The valve H has a restricted entrance at its top for compressed air. The valve F includes a vent 57 to atmosphere and through which air may escape from the valve F when the actuator F' is in its non-normal position.

A valve G is provided having an actuator which consists merely of an extension G' from the arm 28', the valve G being a normally seated valve plug 60 against a seat 62 caused by the action of the spring 58.

Vents 55 are provided in the actuators F' and H' to prevent undesired back pressure.

The dispensing nozzle 48 has a dispensing trigger 50 for opening a normally closed oil dispensing valve K for thus permitting a dispensation of oil from a discharge nozzle 52 thereof.

The valve 48 is provided with pins 54 or the like to engage the supporting hook D' which is preferably of forked construction. A bleeder valve L for the actuators F' and C' is provided on the dispensing nozzle 48 for permitting the escape of air from an air hose 46. The oil is conducted to the dispensing nozzle 48 by an oil hose 44, the hoses 44 and 46 being preferably flexible so as to permit carrying of the dispensing nozzle to the proper position on a part of an automobile or the like into which the oil is to be dispensed. Check valves 10, 12 and 14 are mounted in the pipe lines as shown in Figures 4 and 5 and the purpose of these will be hereinafter set forth.

Our apparatus includes a unit 66 (see Figure 5) having therein a blow out valve J actuated by a diaphragm type of actuator J' and a transfer valve M actuated by a diaphragm type of actuator M'. Within the unit 66 we provide an air chamber 68 within which a charge of air may be trapped between the transfer valve M and the check valve 10.

To prevent congealing of the oil in cold weather and thus insure ready flow of the oil when it is to be dispensed, we provide electric heaters 70 located at suitable points. By way of illustration we have shown them located adjacent the valves A, C, F and H and in the air chamber 68.

With reference to specific details of the storage tanks S, S², S³ and S⁴, each of these at its base is provided with a normally spring closed valve 72 and a valve seat 74 therefor. The base 76 of the dispenser has an oil passageway 78 for each storage tank, these passageways leading to the various valve units A, A², A³ and A⁴ through stand pipes 80. The base 76 is provided with a pin 82 for each storage tank to engage the valve 72 and automatically unseat it when the storage tank is placed in position. A gasket 84 is provided for sealing the storage tank relative to the base.

In order to force the storage tank against the gasket 84, a set screw 86 is provided for each storage tank, the set screws being mounted in a frame 88 supported relative to the base 76 by columns 90 or the like.

Air connections must be made from the air supply to the top of each storage tank. One of these is indicated at 92 in Figure 1 and may be of the bayonet or other quick detachable type to facilitate changing storage tanks.

With reference to the storage tanks, the valves 72 prevent refilling thereof so that the tanks have to be returned to the refinery for refilling from special refilling equipment. To insure against a tank with the wrong grade of oil being placed at the wrong position on the base 76, we provide each storage tank with a lug 94 adapted to enter a socket 96 in the base 76.

Each tank is provided with a second lug 98 adapted to enter a second socket 100 in the base. The lugs 98 are different distances from the lugs 94 and the sockets 96 and 100 are likewise arranged. Thus a tank with a certain grade of oil can be placed only in one position on the base.

In connection with the dispensing of oil, it is desirable to have a counter for visually indicating when quarts or other predetermined quantities of oil have been completely dispensed. The mechanism for this is illustrated in Figures 6 and 7. Since there is an air blow out operation after each oil dispensing operation, one requirement of the counter is that it shall not move an indicating pointer P to the next graduation on a dial 104 until the air blow out operation has been completed.

The counter mechanism comprises an actuator P' consisting of a cylinder and piston, the piston being connected to a piston rod 106. The piston rod is slidable against the action of a spring 108 and carries an actuating pawl 110 pivoted at 112. A spring 114 tends to keep the actuating pawl 110 against an inclined blade 116 which is pivoted on a shaft 118 of the pointer P. The inclination of the blade 116 can be adjusted by set screws 120.

When the actuator P' is charged with air, the piston thereof and the piston rod 106 will be moved to the dotted line position of Figure 6, thus moving the actuating pawl 110 to its dotted line position where it snaps over the next succeeding tooth of a ratchet wheel 122. The ratchet wheel is secured to the pointer shaft 118.

When the air from the actuator P' is released, the spring 108 expands during the last portion of such release and moves the actuating pawl 110 from its dotted line position to its full line position. This first rotates the ratchet wheel 122 one tooth, thus causing retraction of a spring actuated holding pawl 124 so that it snaps behind the next ratchet wheel tooth. During the snap portion of the operation, a striker 125 strikes a gong 126 to give an audible signal that a quantity of oil has been dispensed and rotation of the ratchet wheel 122 causes the pointer P to move one graduation on the dial 104.

With the actuating pawl 110 in the full line position shown, it will be obvious that a knob 128 on the holding pawl 124 can be pulled outwardly for allowing the ratchet wheel 122 to rotate backwards (or counterclockwise) without interference from the actuating pawl 110.

The ratchet wheel 122 is rotated backwards by a spring 130 having its inner end secured at 132 to the pointer shaft 118 and its outer end secured at 134 to a drum 136. Rotation of the drum 136 is normally prevented by a pin 138 extending from the back thereof and engaging under a lip 140 of a lever 142 pivoted to the frame of the device shown in Figure 8 at 144.

The lever 142 is constrained to engage against a cam 146 on the shaft 118 by a spring 148. The cam 146 has a lobe 150.

A brake is associated with the drum 136 and comprises a brake band 152 having one end secured to the frame at 154 and its other end connected by a spring 156 to an adjusting screw 158 for the tension of the spring and brake band. The operation of the counter will be hereinafter set forth under "practical operation".

In Figures 11, 12 and 13, I have shown a modified form of storage tank construction and a novel storage tank base therefor. The storage tank is indicated by the reference character S⁵ and has therein a valve of similar construction to the one shown in Figure 2. The parts corresponding thereto are provided with the same reference numerals with the addition of the indicating character $a$.

In addition to these parts, a valve seat 160 is provided having a valve 162 normally seated thereagainst by a spring 164. A float 166 is mounted on an arm 168 pivoted at 170 and carries a valve disk 172. The valve disk 172 is adapted to seat against a seat 174 when the oil supply is depleted to stop any further flow of the last remaining portion of the oil and prevent dispensing a partial quart.

*Practical operation*

In order to operate our apparatus, the selector valve O is first adjusted to correspond with the proper storage tank from which oil is to be dispensed. This is accomplished by manually rotating the knob O' until the pointer 11 corresponds with the proper indicating character on the dial 13. Assuming the various elements of the apparatus to be in the position shown in Figures 4 and 5, to dispense a predetermined quantity of oil as measured by the cylinder B and the piston 22, it is then necessary to unhook the nozzle 52 from the hook D' which will initiate a dispensing cycle of operation by first opening the valve D.

Opening of the valve D supplies air from the source of compressed air supply to the closed blow out valve J, the closed master valve E, the open charging valve H and the open four way valve F. The air is stopped at J and E, while it flows through the valve F, part of it charging the actuator H', thus closing the valve H and part of it flowing through the check valve 10 to charge the air chamber 68 and to the selector O from where it flows to the actuator A' selected for opening the valve A. Since air to the valve H is restricted, insufficient air flows therefrom through the check valve 14 and to the actuators F' and C' to actuate them before the actuator H' has been fully actuated.

The oil supply in the storage tank being under pressure will now flow upwardly through the stand pipe 16 into the cylinder 20 and then through the valve A to the oil compartment B' in the cylinder B. This will force the piston 22 upwardly for charging the cylinder B with oil. The air pressure on the oil will raise the piston 22 regardless of the fact that there is no escape for the air above the piston, the piping to the elements P', G, J, M', C and 48 serving as an air chamber to hold such air, which of course will be gradually compressed in such chamber but to less than half the pressure of the air on the oil. This pressure will be insufficient to operate the elements P' and M' against the action of their respective springs which normally prevent their operation.

When the piston 22 strikes the rod 26 and raises it, the valve G will be closed and the master valve E will be opened so that the air from the valve E can flow into the air compartment B" of the cylinder for tending to lower the piston 22 and discharge the oil therefrom. The air from the valve E also passes through the check valve 12 to the actuators C' and F'. This opens the oil valve C so that the oil can then tend to flow to the dispensing nozzle 48 and will flow from it when the oil dispensing valve K is opened manually.

Charging of the actuator F' changes the position of the valve F so that the air supply from the cut-off valve D to the actuator H', the check valve 10 and the selector valve O is cut off and communication is established with the atmosphere through the vent 57 so that the actuator H' returns to its initial position for recycling, the chamber 68 is left with a predetermined charge of air trapped therein and the oil valve A is permitted to close.

With the oil dispensing valve K held open, the measured quantity of oil will be dispensed by the compressed air through the valves D and E forcing the piston 22 downwardly relative to the cylinder B. At the lower end of the stroke, the valve E will be closed for recycling and the valve G will be opened for permitting the air trapped in the compartment B" of the cylinder B to flow from the valve G to the valve C and to the actuator M'.

The air that flows to the valve C will flow outwardly through the hose 44 for cleaning out the film of oil therein, while the air that flows to the actuator M' will open the transfer valve M so that the predetermined charge of air in the air chamber 68 will flow to the actuator J'. This will open the blow out valve J so that some of the direct air pressure from the air supply cut-off valve D also flows into the oil outlet valve C to aid in the blow out operation during which, though the actuator C' is charged, the valve C acts as a check valve and closes.

The length of time the blow out valve J is open is determined by the size of the air chamber 68 and by the size of a vent 71 of the actuator J' which gradually releases the air in the actuator to atmosphere. When it is almost completely released, the blow out valve J being spring closed will close so that no more direct air pressure flows through the hose 44. Thus means is provided for augmenting the exhaust air from the compartment B" of the cylinder B in the blow out operation.

The counter mechanism of Figure 6, it will be noted, has its actuator P' also connected with the blow out and exhaust valve G and accordingly the actuating pawl 110 will be moved to the dotted line position when the master valve E is first opened and will not return to its full line position until most all the air has been exhausted from the compartment B" through the valve G and hose 44. Thus the pointer will not be moved to the next graduation until the last portion of the blow out operation.

Whenever it is desired to return the pointer to "0", as when attending to a new customer, it is merely necessary to pull out the knob 128 whereupon the ratchet wheel 122 will rotate backwardly until the lobe 150 of the cam 146 strikes the upper end of the lever 142 as shown by full lines in Figure 7.

If it so happens that the pointer P, in counting, is permitted to rotate more than a full revolution, the spring 130 will become too tight. We therefore provide the lobe 150 so associated with the lever 142 that it will move it to the dotted line position shown in Figure 7 as the pointer P is being moved from number "7" to number "0" on the dial 104. This will release the pin 138 of the drum 136 so that the spring 130 will rotate the drum forwardly at a slow speed because of the brake band 152, so that by the time the pin 138 again reaches the lip 140, the pointer P will have reached the character "0" on the dial and thus permit the lever 142 to return to position to stop the pin 138. Thus during each successive revolution of the pointer P, the spring is wound up one turn, but at the completion of each revolution, it is permitted to unwind one turn, thus maintaining the proper tension.

If the operator so desires, he can dispense a second quantity of liquid without returning the dispensing nozzle 48 to the hook D'. This is accomplished by depressing the bleeder valve L, which closes the oil outlet valve C in position for recycling and opens the valve F so that it can charge the actuator H', the air chamber 68 and the selector valve O in the manner already described and thus restart the dispensing cycle of operation.

Since it is difficult to entirely eliminate air leaks in the apparatus, the actuators F' and C' will automatically return to the initial positions shown in Figure 5 if the nozzle 48 is left hanging on the hook D' long enough as this shuts off the air supply and such leakage would bleed the line 46. If, when unhooking the nozzle, the operator finds that such automatic bleeding has not been completed, he merely depresses the valve L to thus complete it manually. The charging valve H insures that the line 46 and consequently the actuators F' and C' will remain fully charged with air while the nozzle 48 is off the hook even though there are air leaks.

In the operation of the apparatus shown in Figures 11, 12 and 13, it will be noted that the storage tank S⁵ is connected to the indicating cylinder 20 in the same manner that the storage tanks S, S², S³ and S⁴ are. A check valve is provided at 176. A branch conduit 178 connects with the conduit leading from the selector and charging control valve F to the selector valve O. Accordingly, when the valve D is opened and the air from the air supply thereby flows through the valve F to the selector O, it will also flow into a compartment 180 of the storage tank base 76a. It will retain the valve 162 closed and tend to force the oil out through the pipe 78a and through the pipe 80 to the indicating cylinder 20.

After the completion of the dispensing operation, when the valve E trips to the opposite position shown in Figures 4 and 5, the position of the valve F will change so that the air from the valve 178 will be discharged through the vent 57 to atmosphere as in Figure 13. This relief of the air pressure permits the oil from the storage tank S⁵ to open the valve 162 and flow by gravity into the compartment 180 to fill it prior to receiving another charge of air from the pipe 178 and thus discharging another quantity of oil to the dispensing cylinder.

By this construction it is not necessary to keep the storage tank S⁵ itself full of compressed air as in the system illustrated in Figure 4.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:—

1. In a liquid dispensing apparatus, a dispensing cylinder having a piston therein at one end thereof, a source of liquid under pressure, a liquid supply valve, a conduit from said source of liquid under pressure through said liquid supply valve to said dispensing cylinder, means for opening said liquid supply valve and thereby admitting liquid under pressure to said cylinder to move said piston to the other end thereof, a master valve opened by said piston upon reaching said other end to admit actuating fluid to said other end and force said piston in the opposite dispensing direction, an exhaust valve operable by said piston upon reaching the first mentioned end of said cylinder to exhaust air from said other end of said cylinder and a blow out valve opened by exhausted air to blow out the discharge line from said dispensing cylinder.

2. In a liquid dispensing apparatus, a dispensing cylinder having a piston therein at one end thereof, a source of liquid under pressure, a liquid supply valve, a conduit from said source of liquid under pressure through said liquid supply valve to said dispensing cylinder, means for opening said liquid supply valve and thereby admitting liquid under pressure to said cylinder to move said piston to the other end thereof, a master valve opened by said piston upon reaching said other end to admit actuating fluid to said other end and force said piston in the opposite dispensing direction, an exhaust valve operable by said piston upon reaching the first mentioned end of said cylinder to exhaust air from said other end of said cylinder and a blow out valve structure comprising a blow out valve, an air chamber and a transfer valve, said transfer valve being opened by exhausted air to admit air from said air chamber to open said blow out valve, said blow out valve being connected with the discharge line from said dispensing cylinder to blow it out when the blow out valve is open.

3. In a liquid dispensing apparatus, a dispensing cylinder having a piston therein at one end thereof, a source of liquid under pressure, a liquid supply valve, a conduit from said source of liquid under pressure through said liquid supply valve to said dispensing cylinder, means for opening said liquid supply valve and thereby admitting liquid under pressure to said cylinder to move said piston to the other end thereof, a master valve opened by said piston upon reaching said other end to admit actuating fluid to said other end and force said piston in the opposite dispensing direction, an exhaust valve operable by said piston upon reaching the first mentioned end of said cylinder to exhaust air from said other end of said cylinder and a blow out valve structure comprising a blow out valve, an air chamber, a transfer valve, said transfer valve being opened by exhausted air to admit air from said air chamber to open said blow out valve, said blow out valve being connected with the discharge line from said dispensing cylinder to blow it out when the blow out valve is open and a leak for said air chamber to exhaust air therefrom to atmosphere and thereby time the period of opening of said blow out valve.

4. In a liquid dispensing apparatus, a dispensing cylinder, a liquid dispensing valve connected therewith, said valve comprising a valve plug constrained to remain closed and a pressure chamber, said pressure chamber when charged permitting said valve plug to move to open position upon liquid flow therethrough under pressure, a blow out air line and a discharge line connected with said valve and a valve operating line connected with said pressure chamber, said valve plug being closeable independent of said pressure chamber to prevent blow out air from flowing from said blow out air line to said dispensing cylinder and confining it to flow from said blow out air line through said discharge line when said pressure chamber is charged.

5. In a liquid dispensing apparatus, a plurality of individual storage tanks, dispensing mechanism communicating with each storage tank, a single dispensing nozzle communicating with said dispensing mechanism and means for dispensing a quantity of liquid selectively from any one of said storage tanks through said dispensing mechanism to said dispensing nozzle comprising a selector valve, an oil supply valve for each of said storage tanks, an actuator for each oil supply valve, said selector valve being operable to supply actuating fluid to the actuator selected and a master valve operable by movement of said dispensing mechanism to admit compressed air to said dispensing mechanism to thereby force such quantity to said dispensing nozzle.

6. In a liquid dispensing apparatus, a dispensing cylinder, a plurality of storage tanks, actuatable liquid supply valves, one for each storage tank and located between the storage tank and the dispensing cylinder and means for actuating a selected one of said liquid supply valves comprising a selector valve, a source of actuating fluid connected therewith, a connection between said selector valve and each of said liquid supply valves, said selector valve being settable to connect the desired one of said liquid supply valves with said source of actuating fluid and a valve for controlling the supply of actuating fluid to said selector valve.

7. In a liquid dispensing apparatus, a dispensing cylinder, a plurality of storage tanks, actuatable liquid supply valves, one for each storage tank and located between the storage tank and the dispensing cylinder and means for actuating a selected one of said liquid supply valves comprising a selector valve, a source of actuating fluid connected therewith, a connection between said selector valve and each of said liquid supply valves, said selector valve being settable to connect the desired one of said liquid supply valves with said source of actuating fluid and a valve for controlling the supply of actuating fluid to said selector valve, said selector valve including a cylinder and a pair of cup leathers opening toward each other, rotatable relative to said cylinder and subjected to pressure of the actuating fluid between them whereby upon said cylinder receiving said actuating fluid, rotation of said cup leathers is prevented.

8. In a liquid dispensing apparatus, a dispensing cylinder, means for introducing actuating fluid thereto to effect a dispensing operation and for exhausting actuating fluid therefrom at the completion of said dispensing operation and a counter for the dispensing operations comprising a pressure chamber connected with said cylinder and a ratchet operated pointer, the ratchet mechanism thereof being operable to be set when actuating fluid enters said pressure chamber and to actuate said pointer when the actuating fluid leaves the pressure chamber.

9. In a liquid dispensing apparatus, a dispensing cylinder, means for introducing actuating fluid thereto to effect a dispensing operation and for exhausting actuating fluid therefrom at the completion of said dispensing operation, a counter for the dispensing operations comprising a pressure chamber connected with said cylinder and a ratchet operated pointer, the ratchet mechanism thereof being operable to be set when actuating fluid enters said pressure chamber and to actuate said pointer when the actuating fluid leaves the pressure chamber and an audible signal operated by said counter when said pointer is actuated.

10. In a liquid dispensing apparatus, a dispensing cylinder, means for introducing actuating fluid thereto to effect a dispensing operation and for exhausting actuating fluid therefrom at the completion of said dispensing operation and a counter for the dispensing operations comprising a pressure chamber connected with said cylinder, a ratchet operated pointer, the ratchet mechanism thereof being operable to be set when actuating fluid enters said pressure chamber and to actuate said pointer when the actuating fluid leaves the pressure chamber, said ratchet mechanism including a spring tending to return said pointer to zero and a manual release for said spring.

11. In a liquid dispensing apparatus, a dispensing cylinder, means for introducing actuating fluid thereto to effect a dispensing operation and for exhausting actuating fluid therefrom at the completion of said dispensing operation and a counter for the dispensing operations comprising a pressure chamber connected with said cylinder, a ratchet operated pointer, the ratchet mechanism thereof being operable to be set when actuating fluid enters said pressure chamber and to actuate said pointer when the actuating fluid leaves the pressure chamber, said ratchet mechanism including a spring tending to return said pointer to zero and a releasing device operable to unwind said spring one revolution after said pointer has rotated one revolution.

12. In a liquid dispensing apparatus, a dispensing cylinder, means for introducing actuating fluid thereto to effect a dispensing operation and for exhausting actuating fluid therefrom at the completion of said dispensing operation and a counter for the dispensing operations comprising a pressure chamber connected with said cylinder, a ratchet operated pointer, the ratchet mechanism thereof being operable to be set when actuating fluid enters said pressure chamber and to actuate said pointer when the actuating fluid leaves the pressure chamber, said ratchet mechanism including a spring tending to return said pointer to zero, a manual release for said spring for returning said pointer to zero and a releasing device operable to unwind said spring one revolution after said pointer has rotated one revolution.

13. In a liquid dispensing apparatus, a dispensing cylinder, a discharge line therefrom, a liquid supply valve for admitting liquid to said cylinder, a liquid dispensing valve in said discharge line for dispensing liquid from said cylinder, a charging valve for charging a portion of said dispensing apparatus with actuating fluid, a charging control valve for controlling the flow of actuating fluid to said charging valve, a chamber, a transfer valve and a blow-out valve for transferring actuating fluid from said chamber to said blow-out valve and for blowing out said discharge line respectively, and electric heaters adjacent each of said valves through which liquid flows to prevent congealing of the liquid dispenser therethrough.

14. In a liquid dispensing apparatus, a base and a plurality of storage tanks cooperating therewith and supported thereby, said base having passages to receive liquid from said storage tanks, said base and said tanks having upwardly and downwardly opening cooperating connecting parts respectively, the connecting parts of said base being each in communication with one of said passageways and having different characteristics and the connecting part of each tank having characteristics similar to a predetermined one of said connecting parts of said base with which it is to cooperate to insure cooperation of only a predetermined tank with a predetermined connecting part only of said base.

15. In a liquid dispensing apparatus, a base and a plurality of storage tanks cooperable therewith, said base having passageways to receive liquid from said storage tanks, said base and said tanks having cooperating connecting parts, the connecting parts of said base being each in communication with one of said passageways and having different characteristics and the connecting part of each tank having characteristics similar to the connecting part of said base with which it cooperates to insure cooperation of a predetermined tank with a predetermined connecting part of said base, a normally closed valve in the connecting part of each storage tank and means projecting from said base to open said valve when said tank is mounted on said base.

16. In liquid dispensing apparatus, a dispensing cylinder having a piston therein, a source of liquid under pressure, a conduit from said source of liquid under pressure to said dispensing cylinder, a dispensing nozzle connected with said cylinder, means for admitting liquid under pressure to said cylinder to move said piston in one direction, compressed air operated means to move said piston in the opposite dispensing direction, an exhaust valve operable by said piston after travel in said dispensing direction to exhaust air from said cylinder and a blow-out valve operated by exhausted air to blow out said dispensing nozzle.

17. In liquid dispensing apparatus, a dispensing cylinder having a piston therein, a source of liquid under pressure, a conduit from said source of liquid under pressure to said dispensing cylinder, a dispensing nozzle connected with said cylinder, means for admitting liquid under pressure to said cylinder to move said piston in one direction, compressed air operated means to move said piston in the opposite dispensing direction, an exhaust valve operable by said piston after travel in said dispensing direction to exhaust air from said cylinder and a blow-out valve structure comprising a blow-out valve, an air chamber and a transfer valve, said transfer valve being operated by exhausted air to admit air from said air chamber to open said blow-out valve, said blow-out valve being connected with said dispensing nozzle to blow it out when the blow-out valve is opened.

18. In a liquid dispensing apparatus, a dispensing cylinder having a piston therein, a source of liquid under pressure, a conduit from said source of liquid under pressure to said dispensing cylinder, a dispensing nozzle connected with said cylinder, means for admitting liquid under pressure to said cylinder to move said piston in one direction, compressed air operated means to move said piston in the opposite dispensing direction, an exhaust valve operable by said piston after travel in said dispensing direction to exhaust air from said cylinder and a blow-out valve structure comprising a blow-out valve, an air chamber and a transfer valve, said transfer valve being operated by exhausted air to admit a charge of air then in said air chamber to open said blow-out valve, said blow-out valve being connected with said dispensing nozzle to blow it out when the blow-out valve is opened and a vent for said blow-out valve to exhaust said charge of air therefrom to atmosphere and thereby time the period during which said blow-out valve is held open by said charge of air.

19. In a liquid dispensing apparatus, a plurality of individual storage tanks, dispensing mechanism communicating with each of said storage tanks, a single dispensing nozzle communicating with said dispensing mechanism, a liquid supply valve for each of said storage tanks, an actuator for each liquid supply valve and means for dispensing a quantity of liquid selectively from any one of said storage tanks through said dispensing mechanism to said dispensing nozzle comprising a selector valve having a single connection with a source of actuating fluid and a plurality of connections, one with each of said actuators to supply actuating fluid to a selected actuator and means operable by movement of said dispensing mechanism as caused by admission of liquid from one of said storage tanks through its liquid supply valve to said dispensing mechanism to cause reverse movement of said dispensing mechanism to thereby force such quantity to said dispensing nozzle.

20. In a liquid dispensing apparatus, a dispensing cylinder, a plurality of storage tanks, actuatable liquid supply valves, one for each storage tank and located between the storage tank and the dispensing cylinder and means for actuating a selected one of said liquid supply valves comprising a selector valve, a source of actuating fluid connected therewith, a connection between said selector valve and each of said liquid supply valves, said selector valve being settable to connect the desired one of said liquid supply valves with said source of actuating fluid and means for supplying actuating fluid to said selector valve, said selector valve including means normally movable manually and subjectable to pressure of said actuating fluid within the selector valve whereby upon said selector valve receiving said actuating fluid, resetting thereof is prevented until the actuating fluid is released therefrom.

21. In a liquid dispensing apparatus, a source of liquid under pressure, a dispensing pump, a dispensing hose connected with said pump, a dispensing nozzle connected with said hose, a dispensing valve for controlling the flow of fluid through said hose and means for dispensing a quantity of liquid from said source through said dispensing pump to said dispensing nozzle comprising a supply valve for admitting liquid from said source to said dispensing pump and an exhaust valve for simultaneously therewith permitting escape of air from said pump compressed by said liquid entering said pump, said exhaust valve being connected with said dispensing hose and being closed by said pump when filled with liquid, an air admission valve operable by said pump when filled and connected with said pump to cause reverse motion thereof to force said liquid through said nozzle when said dispensing valve is open, said pump at the end of its reverse movement opening said exhaust valve to permit air used to cause said reverse movement to be discharged to atmosphere through said hose, nozzle and dispensing valve.

22. In a liquid dispensing apparatus, a source of liquid under pressure, a dispensing pump, a dispensing hose connected with said pump, a dispensing nozzle connected with said hose, a dispensing valve for controlling the flow of fluid through said hose and means for dispensing a quantity of liquid from said source through said dispensing pump to said dispensing nozzle comprising a supply valve for admitting liquid from said source to said dispensing pump and an exhaust valve for simultaneously therewith permitting escape of air from said pump compressed by said liquid entering said pump, said exhaust valve being connected with said dispensing hose and being closed by said pump when filled with liquid, an air admission valve operable by said pump when filled and connected with said pump to cause reverse motion thereof to force said liquid through said nozzle when said dispensing valve is open, said pump at the end of its reverse movement opening said exhaust valve to permit air used to cause said reverse movement to be discharged to atmosphere through said hose, nozzle and dispensing valve and a blow out valve for supplying additional air to said hose for the blow out operation, said blow out valve being operable by exhaust air from said exhaust valve when it is opened at the end of said reverse movement.

23. In a liquid dispensing apparatus, a source of compressed air, a plurality of storage tanks, a dispensing cylinder having a piston therein, a conduit for admitting liquid from any one of said storage tanks to one end of said cylinder, a conduit for discharging liquid from said end of said cylinder, a valve for exhausting air from the other end of said cylinder, a second valve for admitting compressed air from said source of compressed air to said other end, said valves being operated by said piston assuming its opposite limits of travel and means to conduct air exhausted from said cylinder to said second mentioned conduit and for supplementing such air with additional air from said source of compressed air.

24. In a liquid dispensing apparatus, a dispensing cylinder, a plurality of storage tanks, a liquid supply valve for each storage tank and connected with said dispensing cylinder, a discharge hose, a liquid dispensing valve between said dispensing cylinder and said discharge hose, a master valve and an exhaust valve respectively controlling a supply of compressed air to said dispensing cylinder and the exhaust of air therefrom, a selector operable to actuate a selected one of said liquid supply valves and an air operated indicator connected with said exhaust valve to receive air therefrom and operable thereby to a set position upon receipt of such air and returning to indicating position upon reduction of the pressure of such air to adjacent atmospheric pressure.

25. In a liquid dispensing apparatus, a dispensing cylinder, a plurality of storage tanks, a liquid supply valve for each storage tank and connected with said dispensing cylinder, a discharge hose, a liquid dispensing valve between said dispensing cylinder and said discharge hose, a master valve and an exhaust valve for respectively controlling a supply of compressed air to said dispensing cylinder and the exhaustion of air therefrom, an actuator for each of said liquid supply valves, a selector having a manually movable element operable to selectively connect with a desired one of said actuators to supply compressed air thereto when said master valve is open, a selector control valve operable to actuate the one of said liquid supply valves selected, a bleeder line connected with said liquid dispensing valve to close it when bled, a charging valve to charge said bleeder line at the completion of the dispensing operation and a bleeder valve for bleeding said bleeder line to initiate operation of the apparatus to cause another dispensing operation.

26. In a liquid dispensing apparatus, a dispensing cylinder, a plurality of storage tanks, a liquid supply valve for each storage tank and connected with said dispensing cylinder, a discharge hose, a liquid dispensing valve between said dispensing cylinder and said discharge hose, a master valve and an exhaust valve for respectively controlling a supply of compressed air to said dispensing cylinder and the exhaustion of air therefrom, an actuator for each of said liquid supply valves, a selector having a manually movable element operable to selectively connect with a desired one of said actuators to supply compressed air thereto when said master valve is open and a selector control valve operable to actuate the one of said liquid supply valves selected.

27. In a liquid dispensing apparatus, a source of actuating fluid, a storage tank, a dispensing mechanism, a dispensing hose and means for dispensing a quantity of liquid from said storage tank through said dispensing mechanism and said dispensing hose comprising an exhaust valve operable to permit such quantity to flow under pressure from said storage tank into said dispensing mechanism and a valve operable to admit actuating fluid from said source to said dispensing mechanism and thereby force such quantity through said dispensing hose, means of communication between said source and said hose, a valve in said means of communication, said exhaust valve being connected with said dispensing hose and with said last mentioned valve to open it, said valves being operable respectively to discharge exhaust fluid from said dispensing mechanism and actuating fluid from said source into said hose at the completion of the liquid dispensation.

28. In a liquid dispensing apparatus, a dispensing cylinder, a piston reciprocable therein, a liquid supply tank hydraulically connected with one end of said cylinder, a liquid supply valve between said tank and said cylinder, a nozzle hydraulically connected with said end of said cylinder, a liquid dispensing valve between said cylinder and said nozzle, a master valve and exhaust valve connected with the other end of said cylinder, said master and exhaust valves being operable by movement of said piston, a control valve, said master valve being operatively connected with said control valve to actuate it at the beginning of the filling operation of said cylinder, said control valve being operatively connected with said liquid supply valve to open it at the beginning of said filling operation, said master valve also being operatively connected with said control valve and with said liquid dispensing valve for respectively actuating the control valve at the completion of said filling operation and thereby closing said liquid supply valve and actuating said liquid dispensing valve so that the liquid in said cylinder may be dispensed therefrom to said nozzle, said master valve also at said completion of the filling operation, supplying actuating fluid to said cylinder through its connection therewith to move said piston in a dispensing direction.

29. In a liquid dispensing apparatus, a dispensing cylinder, a piston reciprocable therein, a liquid supply tank hydraulically connected with one end of said cylinder, a liquid supply valve between said tank and said cylinder, a nozzle hydraulically connected with said end of said cylinder, a liquid dispensing valve between said cylinder and said nozzle, an actuator for said liquid supply valve, an actuator for said liquid dispensing valve, a master valve connected with the other end of said cylinder, an exhaust valve connected with said other end of said cylinder, actuators for said master and exhaust valves operable by movement of said piston, a control valve, an actuator therefor, said master valve being connected with said control valve to supply actuating fluid thereto at the beginning of the filling operation of said cylinder, said control valve being connected with said liquid supply valve actuator to supply actuating fluid thereto at the beginning of said filling operation, said master valve also being connected with said control valve actuator and with said liquid dispensing valve actuator for respectively supplying actuating fluid to the control valve actuator at the completion of said filling operation and thereby releasing actuating fluid from said liquid supply valve actuator and supplying actuating fluid to said liquid dispensing valve actuator so that the liquid in said cylinder may be dispensed therefrom to said nozzle, said master valve also at said completion of the filling operation supplying actuating fluid to said cylinder through its connection therewith to move said piston in a dispensing direction.

30. In combination with the elements of claim 29, a charging valve connected with said control valve actuator and said liquid dispensing valve actuator to keep them charged with actuating fluid while said charging valve is open.

31. In combination with the elements of claim 29, an indicator connected with said other end of said cylinder and said exhaust valve and operable to a set position by receipt of actuating fluid from said cylinder and to indicating position by opening of said exhaust valve to release such actuating fluid from said exhaust valve.

32. In combination with the elements of claim 29, a charging valve connected with said control valve actuator and said liquid dispensing valve actuator to keep them charged with actuating fluid while said charging valve is open, an actuator for said charging valve connected with said control valve, an indicator connected with said other end of said cylinder and said exhaust valve and operable to a set position by receipt of actuating fluid therefrom and to indicating position by opening of said exhaust valve to release such actuating fluid therefrom.

33. In combination with the elements of claim 29, a charging valve connected with said control valve actuator and said liquid dispensing valve actuator to keep them charged with actuating fluid while said charging valve is open, an actuator for said charging valve connected with said control valve and a supply valve connected between a source of actuating fluid and said master valve, said nozzle being supportable thereon when not in use, and operable to close said supply valve when so supported.

34. In combination with the elements of claim 29, an indicator connected with said other end of said cylinder and said exhaust valve and operable to a set position by receipt of actuating fluid therefrom and to indicating position by opening of said exhaust valve to release such actuating fluid therefrom, and a supply valve connected between a source of actuating fluid and said master valve, said nozzle being supportable thereon when not in use and operable to close said supply valve when so supported.

35. In combination with the elements of claim 29, a charging valve connected with said control valve actuator and said liquid dispensing valve actuator to keep them charged with actuating fluid while said charging valve is open, an actuator for said charging valve connected with said control valve, an indicator connected with said other end of said cylinder and said exhaust valve and operable to a set position by receipt of actuating fluid therefrom and to indicating position by opening of said exhaust valve to release such actuating fluid therefrom and a supply valve connected between a source of actuating fluid and said master valve, said nozzle being supportable thereon when not in use and operable to close said supply valve when so supported.

36. In combination with the elements of claim 29, a charging valve connected with said control valve actuator and said liquid dispensing valve actuator to keep them charged with actuating fluid while said charging valve is open, an actuator for said charging valve connected with said control valve and a check valve between said charging valve and said control and liquid dispensing valve actuators to prevent actuating fluid from said actuators from being reduced by returning through said charging valve.

37. In combination with the elements of claim 29, a charging valve connected with said control valve actuator and said liquid dispensing valve actuator to keep them charged with actuating fluid while said charging valve is open, an actuator for said charging valve connected with said control valve, and a check valve between said charging valve and said master valve to prevent the charge of actuating fluid in said control and liquid dispensing valve actuators being reduced by release into said cylinder.

38. In combination with the elements of claim 29, the outlet of said exhaust valve being hydraulically connected with said nozzle and having an exhaust port to atmosphere in the connection and a check valve between said exhaust port and said nozzle to prevent oil from said cylinder being discharged through said exhaust port.

39. In combination with the elements of claim 29, the outlet of said exhaust valve being hydraulically connected with said nozzle for discharging actuating fluid therethrough.

40. In combination with the elements of claim 29, the outlet of said exhaust valve having hydraulic connection with said nozzle for discharging actuating fluid therethrough, means operable upon opening of said exhaust to discharge supplemental actuating fluid therethrough.

41. In combination with the elements of claim 29, a charging valve connected with said control valve actuator and said liquid dispensing valve actuator to keep them charged with actuating fluid while said charging valve is open, a bleeder valve connected with said control and liquid dispensing valve actuators to bleed them for initiating another dispensing cycle of the apparatus.

42. In combination with the elements of claim 29, a charging valve connected with said control valve actuator and said liquid dispensing valve actuator to keep them charged with actuating fluid while said charging valve is open, an actuator for said charging valve connected with said control valve.

43. In a liquid dispensing apparatus, a dispensing cylinder, a piston reciprocable therein, a liquid supply tank hydraulically connected with one end of said cylinder, a liquid supply valve between said tank and said cylinder, a nozzle hydraulically connected with said end of said cylinder, a liquid dispensing valve between said cylinder and said nozzle, an actuator for opening said liquid supply valve, an actuator for opening said liquid dispensing valve, a master valve connected with a source of actuating fluid and with the other end of said cylinder, an exhaust valve connected with said other end of said cylinder, said master valve and said exhaust valve being operable by movement of said piston, a three way control valve and an actuator therefor, said master valve being connected with one way of said control valve to supply actuating fluid thereto at the beginning of the filling operation of said cylinder, a second way of said control valve being connected with said liquid supply valve actuator to supply actuating fluid thereto at the beginning of said filling operation, said master valve also being connected with said control valve actuator and with said liquid dispensing valve actuator for respectively supplying actuating fluid to the control valve actuator at the completion of said filling operation and thereby releasing actuating fluid from said liquid supply valve actuator and supplying actuating fluid to said liquid dispensing valve actuator so that the liquid in said cylinder may be dispensed therefrom to said nozzle, said master valve also at said completion of the filling operation supplying actuating fluid to said cylinder through its connection therewith to move said piston in a dispensing direction.

44. In a liquid dispensing apparatus, a plurality of storage tanks, dispensing mechanism, a dispensing hose, a dispensing nozzle and means for dispensing a quantity of liquid selectively from any of said storage tanks through said dispensing mechanism and said dispensing hose to said dispensing nozzle comprising an exhaust valve operable to exhaust air from said dispensing mechanism and thereby permit such quantity to flow under pressure from said storage tank into said dispensing mechanism and a valve operable to then admit compressed air to said dispensing mechanism and thereby force such quantity through said dispensing hose to said dispensing nozzle, a blow valve connected with said dispensing hose, an air operated actuator therefor, the exhaust line from said exhaust valve being connected with said actuator whereby to open said blow valve for a time period to blow air into said dispensing hose after said quantity of oil has been dispensed therethrough.

45. In a liquid dispensing apparatus, a plurality of individual storage tanks, dispensing mechanism having communication with each storage tank, a single dispensing nozzle communicating with said dispensing mechanism and means for dispensing a quantity of liquid selectively from any of said storage tanks, through said dispensing mechanism to said dispensing nozzle comprising selectively operable valves, one for each of said storage tanks and arranged between the tanks and said dispensing mechanism and operable when open to cause said dispensing mechanism to receive such quantity under pressure from the selected storage tank, means to force such quantity from said dispensing mechanism to said dispensing nozzle, and a valve operated by said dispensing mechanism at the completion of dispensing such quantity and having an intake connected with a source of air under pressure and an outlet connected with said nozzle to admit air from said source to said nozzle to clean out the film of last dispensed liquid from the inner walls thereof.

46. Apparatus of the character described comprising a storage tank, a pump for receiving liquid therefrom, a dispensing nozzle for dispensing the liquid from the pump, automatic means for operating said pump through a dispensing cycle, the dispensing cycle including the operation of a clean out means for the trapped liquid in the dispensing mechanism and the exhaustion of actuating fluid from the pump, and an indicating device chargeable with the exhausted actuating fluid and operable to indicating position only upon exhaustion of said actuating fluid from said indicating device.

47. In a liquid dispensing apparatus, a plurality of storage tanks, a dispensing cylinder having a piston therein, a conduit for admitting oil from any one of said storage tanks to one end of said cylinder, a conduit for discharging oil from said end of said cylinder, a valve for exhausting air from the other end of said cylinder, a second valve for admitting compressed air to said other end, said valves being operated by said piston assuming its opposite limits of travel and a blow valve connected with said second mentioned conduit and operable by receiving a charge of compressed air exhausted from said cylinder to admit air through the blow valve to said second mentioned conduit.

48. In liquid dispensing apparatus, a dispensing cylinder having a piston therein, a source of liquid under pressure, a conduit from said source of liquid under pressure to said dispensing cylinder, a dispensing nozzle connected with said cylinder, means for admitting liquid under pressure to said cylinder to move said piston in one direction, compressed air operated means to move said piston in the opposite dispensing direction, an exhaust valve operable by said piston after travel in said dispensing direction to exhaust air from said cylinder and a blow-out valve structure comprising a blow-out valve and a pressure chamber for operating said blow-out valve and means for introducing compressed air to said pressure chamber in response to exhausted air from said exhaust valve, said blow-out valve being connected with said dispensing nozzle to blow it out when the blow-out valve is opened.

49. In a liquid dispensing apparatus, a dispensing cylinder, a plurality of storage tanks, a liquid supply valve for each storage tank and connected with said dispensing cylinder, a discharge hose, a liquid dispensing valve between said dispensing cylinder and said discharge hose, a master valve and an exhaust valve respectively controlling a supply of compressed air to said dispensing cylinder and the exhaust of air therefrom, a selector operable to actuate a selected one of said liquid supply valves and an air operated indicator connected with said exhaust valve to receive air therefrom and to be operated thereby.

50. In a liquid dispensing apparatus, a source of liquid under pressure, a dispensing pump, a dispensing hose connected with said pump, a dispensing nozzle connected with said hose, a dispensing valve for controlling the flow of fluid through said hose and means for dispensing a quantity of liquid from said source through said dispensing pump to said dispensing nozzle comprising a supply valve for admitting liquid from said source to said dispensing pump and an exhaust valve for simultaneously therewith permitting escape of air from said pump compressed by said liquid entering said pump, said exhaust valve being connected with said dispensing hose and being closed by said pump when filled with liquid, an air admission valve operable by said pump when filled and connected with said pump to cause reverse motion thereof to force said liquid through said nozzle when said dispensing valve is open, said pump at the end of its reverse movement opening said exhaust valve to permit air used to cause said reverse movement to be discharged to atmosphere, and a blow out valve for supplying air to said hose for the blow out operation, said blow out valve being operable by exhaust air from said exhaust valve when it is opened at the end of said reverse movement.

51. For use with an air operated dispensing mechanism having an air line charged with air during the dispensing operation and exhausted of air at the completion of the dispensing operation, a counter for the dispensing operations including a ratchet, a pawl and an operator for said pawl, said operator being responsive to air in said air line and operable to move said pawl from one tooth of said ratchet to the next one when the air line is charged and means to return said pawl to its initial position to rotate said ratchet and thereby move said counter to a new position only when the dispensing cycle is complete.

52. For use with an air operated dispensing mechanism having an air line charged with air during the dispensing operation and exhausted of air at the completion of the dispensing operation, a counter for the dispensing operations including a ratchet, a pawl and an operator for said pawl, said operator being responsive to air in said air line and operable to move said pawl from one tooth of said ratchet to the next one when the air line is charged, means to return said pawl to its initial position to rotate said ratchet and thereby move said counter to a new position only when the dispensing cycle is complete, and a signal operated by said counter only when it is actuated.

53. For use with an air operated dispensing mechanism having an air line charged with air during the dispensing operation and exhausted of air at the completion of the dispensing operation, a counter for the dispensing operations including a ratchet, a pawl and an operator for said pawl, said operator being responsive to air in said air line and operable to move said pawl from one tooth of said ratchet to the next one when the air line is charged, means to return said pawl to its initial position to rotate said ratchet and thereby move said counter to a new position only when the dispensing cycle is complete, a spring tending to return said counter to zero and a manual release for said spring.

54. For use with an air operated dispensing mechanism having an air line charged with air during the dispensing operation and exhausted of air at the completion of the dispensing operation, a counter for the dispensing operations including a ratchet, a pawl and an operator for said pawl, said operator being responsive to air in said air line and operable to move said pawl from one tooth of said ratchet to the next one when the air line is charged, means to return said pawl to its initial position to rotate said ratchet and thereby move said counter to a new position only when the dispensing cycle is complete, a spring tending to return said counter to zero, a manual release for said spring and a releasing device operable to unwind said spring one revolution after said counter has rotated one revolution.

55. For use with an air operated dispensing mechanism having an air line charged with air during the dispensing operation and exhausted of air at the completion of the dispensing operation, a counter for the dispensing operations including a ratchet, a pawl and an operator for said pawl, said operator being responsive to air in said air line and operable to move said pawl from one tooth of said ratchet to the next one when the air line is charged, means to return said pawl to its initial position to rotate said ratchet and thereby move said counter to a new position only when the dispensing cycle is complete, a spring tending to return said counter to zero and a releasing device operable to unwind said spring one revolution after said counter has rotated one revolution.

CHARLES W. GINTER.
JOHN F. CARTER.